(12) United States Patent
Bakken

(10) Patent No.: US 11,624,475 B1
(45) Date of Patent: Apr. 11, 2023

(54) SPACER FOR USE WITH AN AWNING BRACKET

(71) Applicant: Kelly D. Bakken, Volga, SD (US)

(72) Inventor: Kelly D. Bakken, Volga, SD (US)

( * ) Notice: Subject to any disclaimer, the term of this patent is extended or adjusted under 35 U.S.C. 154(b) by 0 days.

(21) Appl. No.: 17/333,362

(22) Filed: May 28, 2021

(51) Int. Cl.
*E04F 10/00* (2006.01)
*F16M 13/02* (2006.01)

(52) U.S. Cl.
CPC ............ *F16M 13/02* (2013.01); *E04F 10/00* (2013.01)

(58) Field of Classification Search
USPC ......... 52/74, 75, 76, 77, 78; 248/200, 309.1, 248/48.1, 48.2, 273
See application file for complete search history.

(56) References Cited

U.S. PATENT DOCUMENTS

| | | | | |
|---|---|---|---|---|
| 3,722,571 | A * | 3/1973 | Knight | E04F 10/0662 135/904 |
| 3,949,960 | A * | 4/1976 | McKee | E04F 10/0685 248/220.21 |
| 8,082,697 | B2 * | 12/2011 | Griffiths | E04F 10/005 248/273 |
| 2008/0067304 | A1 * | 3/2008 | Barnes | F21V 33/006 248/201 |
| 2011/0121152 | A1 * | 5/2011 | Ghatikar | E04F 13/0853 411/366.1 |
| 2013/0069507 | A1 * | 3/2013 | Dowling | F16M 11/10 312/298 |

\* cited by examiner

*Primary Examiner* — Alfred J Wujciak
(74) *Attorney, Agent, or Firm* — Suiter Swantz pc llo

(57) ABSTRACT

A spacer device for use in mounting an awning bracket to the side of a building having horizontally disposed and overlapping siding members. The spacer includes an upstanding rectangular plate having an upper end, a lower end, a first side edge, a second side edge, an inner side and an outer side. An upper screw opening is formed in the rectangular plate below the upper end thereof. A lower screw opening is formed in the rectangular plate above the lower end thereof. An upper hollow cylindrical shim extends from the inner side of the rectangular plate so that the interior thereof registers with the upper screw opening in the rectangular plate. A lower hollow cylindrical shim extends from the inner side of the rectangular plate so that the interior thereof registers with the lower screw opening in the rectangular plate.

3 Claims, 9 Drawing Sheets

SPACER FOR USE WITH AN AWNING BRACKET

BACKGROUND OF THE INVENTION

Field of the Invention

This invention relates to a spacer for use with an awning bracket, and more particularly, relates to a spacer which may be mounted on the exterior of a wall having horizontally disposed and overlapping siding members so that the awning bracket may be mounted on the wall in a plum manner. Even more particularly, this invention relates to a method of mounting the spacer on a wall having horizontally disposed and overlapping siding members thereon.

Description of the Related Art

In many buildings, such as homes or the like, the outer walls thereof have a plurality of horizontally disposed siding members, having upper and lower ends, which are mounted at the outer side of sheathing with the sheathing board being secured to wood studs which are typically 2"×4". The siding members are mounted in an overlapping fashion thereby resulting in an irregular outer side. Thus, when it is desired to install an awning on the side of the building, a plurality of awning brackets must be secured to the outer side of the wall in a horizontally spaced-apart manner. The irregular surface at the outer side of the wall, created by the overlapping siding members, makes it difficult to properly mount the awning brackets on the side of the building in a plum manner.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A spacer device is disclosed for mounting an awning bracket to the side of a building having horizontally disposed and overlapping siding members with the siding members creating an irregular exterior surface. A spacer device includes an elongated and upstanding rectangular plate having an upper end, a lower end, a first side edge, a second side edge, an inner side and an outer side. A first screw opening is formed in the rectangular plate below the upper end thereof and a second screw opening is formed in the rectangular plate above the lower end thereof. An upper hollow cylindrical shim, having inner and outer ends, extends from the inner side of the rectangular plate so as to communicate with the first screw opening in the rectangular plate. A lower hollow cylindrical shim extends from the inner side of the rectangular plate so as to communicate with the second screw opening in the rectangular plate.

The spacer is mounted on the exterior side of the siding members and drilling an upper opening which extends through the siding members and which terminates at the sheathing of the wall. A lower opening is also drilled in the siding members below the upper opening which extends into the siding members and which terminates at the sheathing. The spacer is mounted on the wall by extending the upper and lower hollow shims into the upper and lower openings in the siding members until the inner ends of the shims engage the exterior surface of the sheathing.

An awning bracket, having upper and lower screw openings, is positioned at the exterior of the spacer so that the upper and lower openings formed therein register with the upper and lower screw openings in the rectangular plate. A screw extends through the upper opening in the awning bracket and extends through the siding and the sheathing into the stud. A lower screw extends through the lower screw opening in the awning bracket, through the lower opening in the rectangular plate and through the lower cylindrical shim until the inner end of the groove is threaded into the stud.

By using the spacer of this invention, the awning bracket is secured to the outer side of the building in a plum manner.

It is therefore a principal object of the invention to provide a spacer device for use with mounting an awning bracket on the exterior side of a building whereby the awning bracket will be positioned in a plum position.

A further object of the invention is to provide a spacer device which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
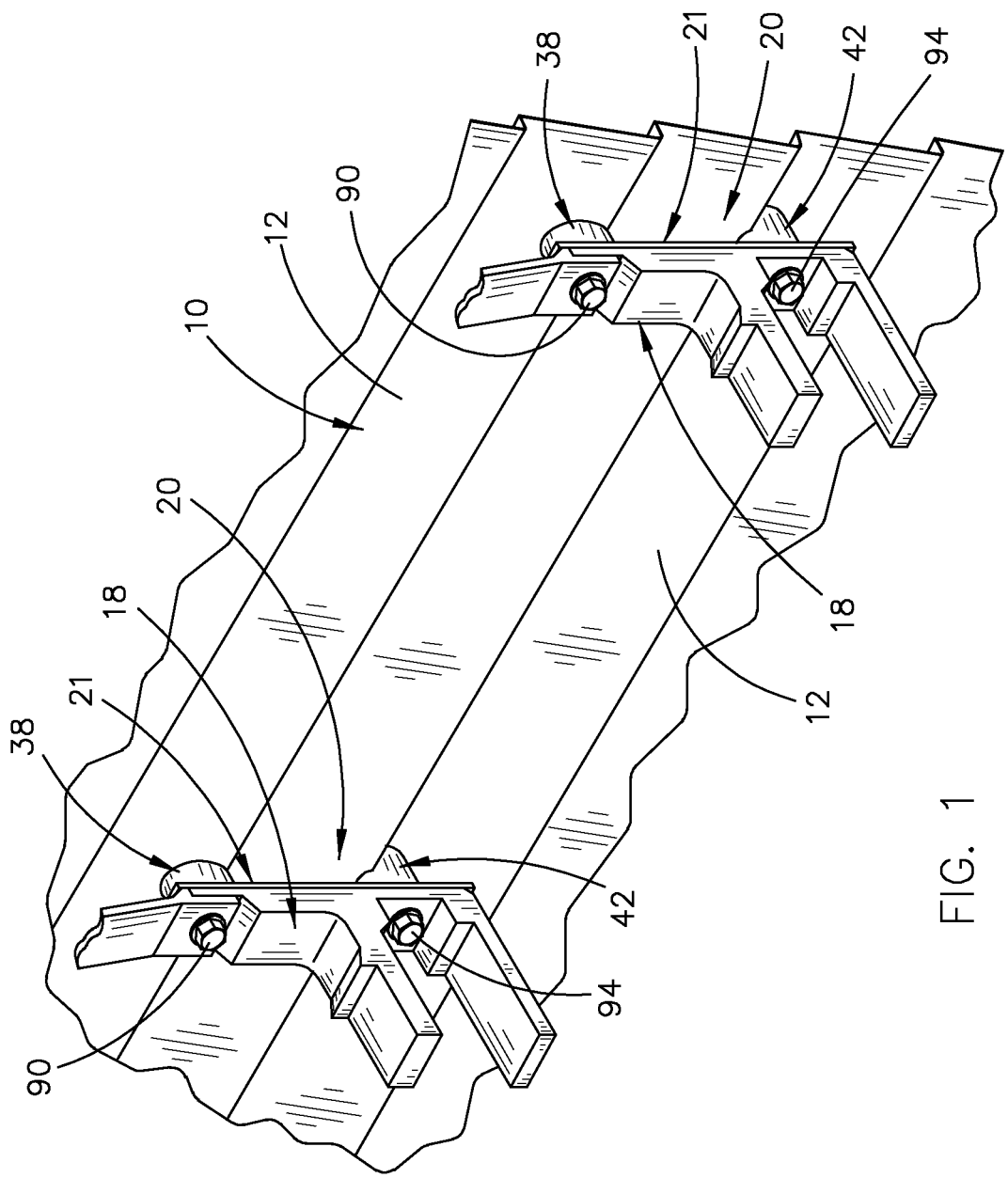
FIG. 1 is a partial outer perspective view illustrating the spacers of this invention positioned adjacent the outer side of a building having horizontally disposed and overlapping siding members and wherein awning brackets are positioned at the outer sides of the spacers with the awning brackets and spacers being secured to the outer side of the building.
Figure 2:
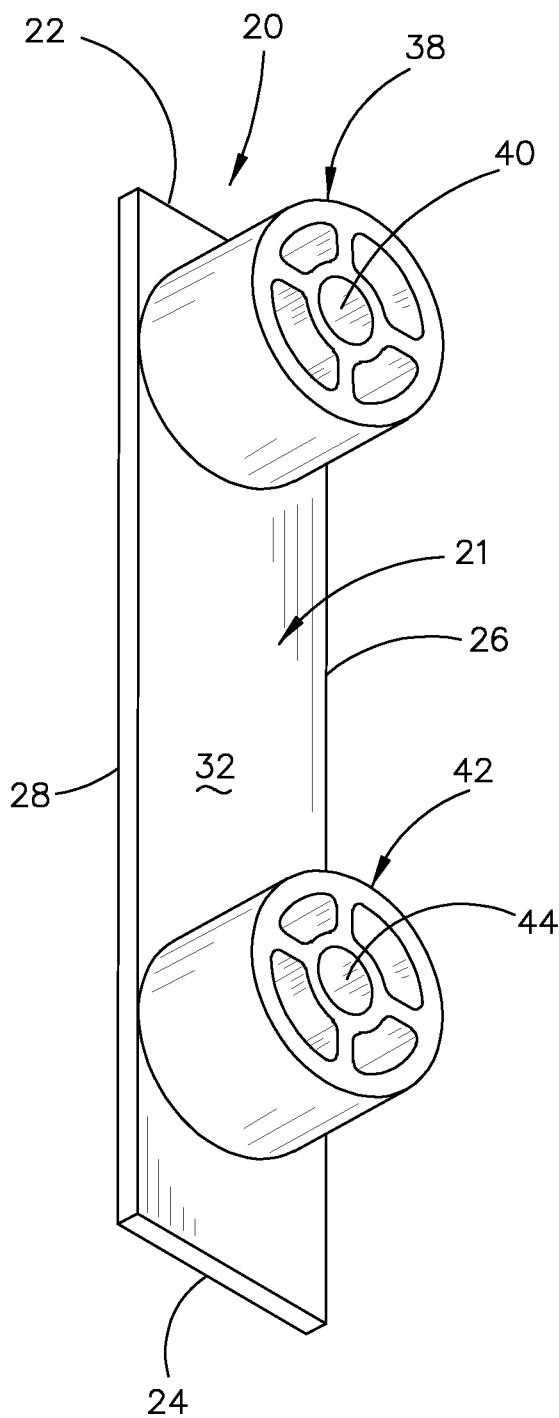
FIG. 2 is an inner perspective view of the spacer of this invention.
Figure 3:
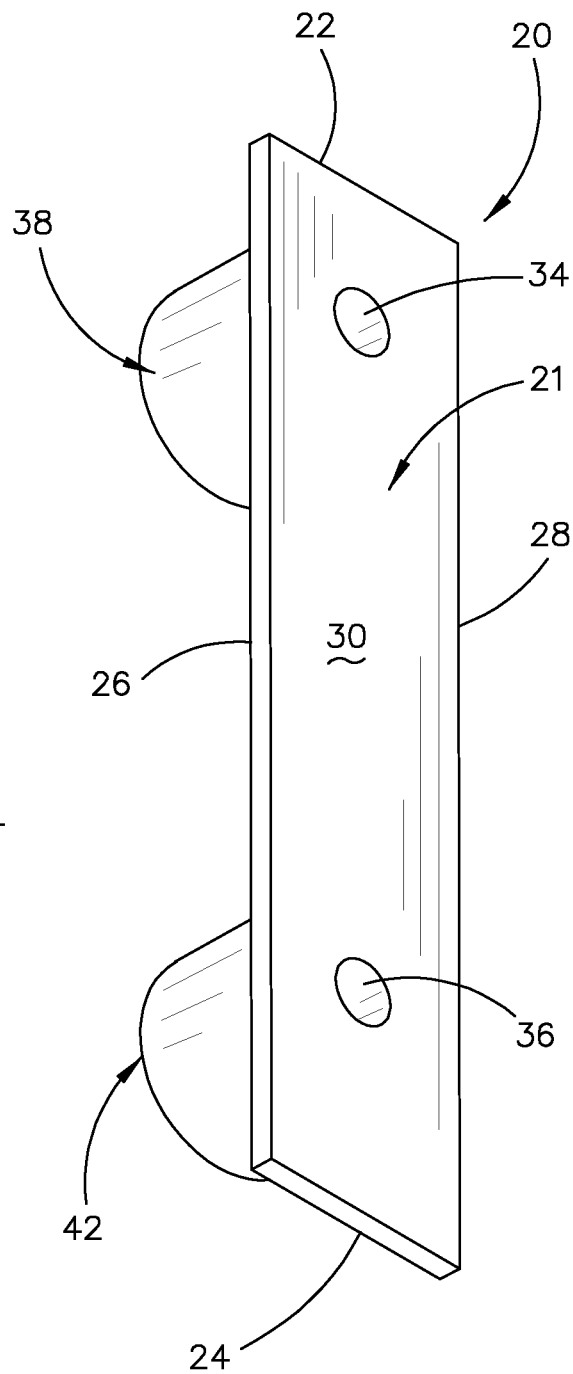
FIG. 3 is an outer perspective view of the spacer of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the side of a building having a plurality of horizontally disposed and elongated siding members 12, which may be wood or plastic, which are installed on the sheathing 14 of the wall in an overlapping manner, with the sheathing 14 being secured to wood studs 16 in conventional fashion. In many cases, a flexible weather barrier is positioned between the sheeting or sheathing 14 at the studs 16. As seen, the overlapping of the siding members creates an irregular exterior side. In normal situations, the awning brackets 18, which may have many different shapes, are mounted on the exterior sides of the siding members 12 which is difficult due to the irregular outer sides of the sliding members 12.

The numeral 20 refers to the spacer of this invention which is configured to be secured to the outer side of the siding members 12 to provide a plum surface to which the awning brackets 18 may be secured as will be disclosed hereinafter. Spacer 20 includes a vertically disposed flat plate 21 having an upper end 22, a lower end 24, a first side 26, a second side 28, an outer side 30 and an inner side 32. Plate 21 has an upper screw opening 34 formed therein and a lower screw opening 36 formed therein.

Spacer 20 includes a horizontally disposed upper hollow cylindrical member or shim 38 which extends from the inner side 32 of plate 21 so as to register with the screw opening 34 in plate 21. The interior of shim 38 has a screw guide 40 at the inner end thereof.

Spacer 20 also includes a horizontally disposed lower hollow cylindrical member or shim 42 which extends from the inner side 32 of plate 21 so as to register with screw opening 36. The interior of shim 42 has a screw guide 44 at the inner end thereof.

Figure 9:
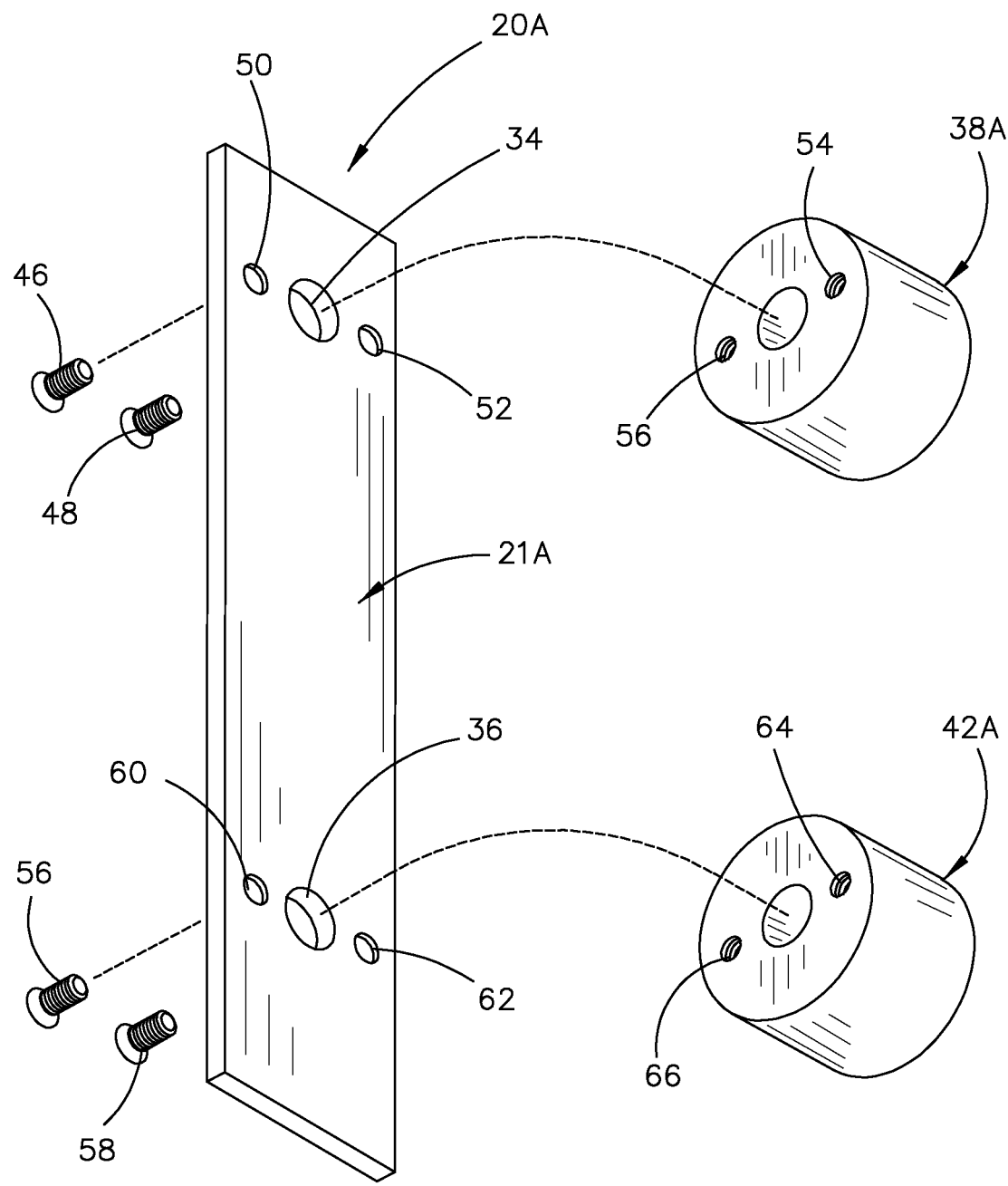
FIG. 9 is an exploded perspective view illustrating a modified form of the spacer of this invention.
Figure 10:
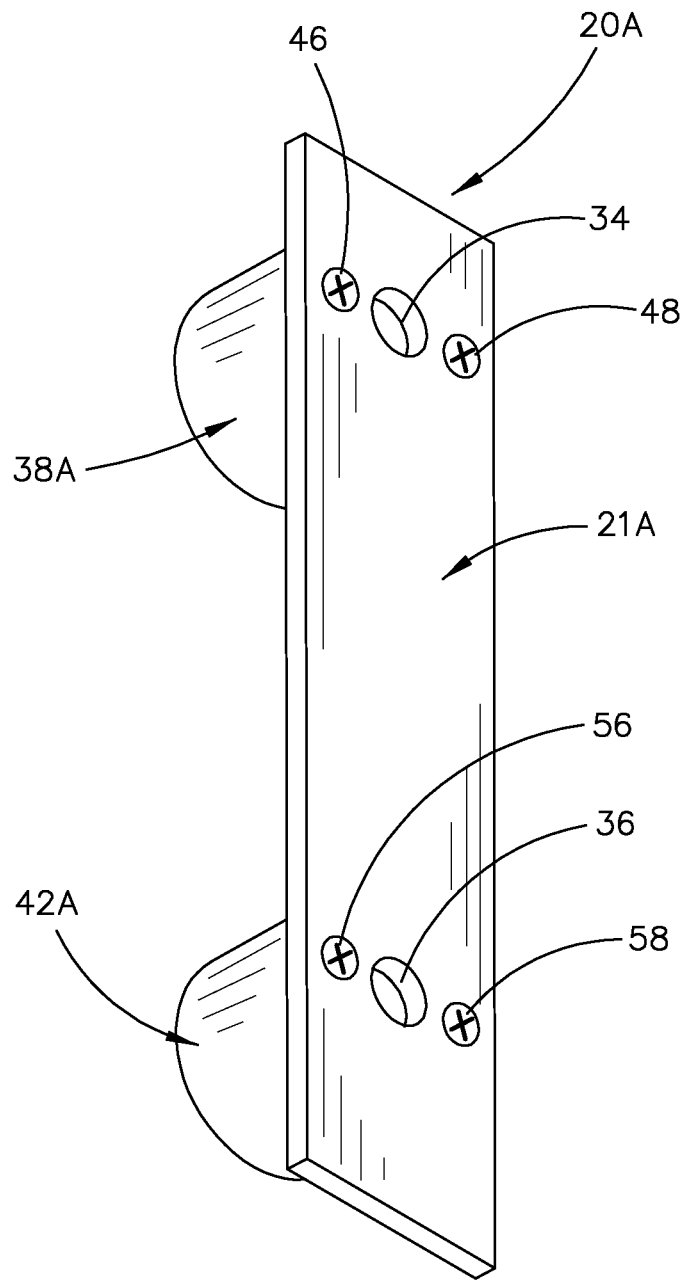
FIG. 10 is an outer perspective view of the modified form of the spacer of FIG. 9.

Preferably, the shims 38 and 42 are cast with plate 21 so that the spacer 20 is of one-piece construction. Preferably, spacer 20 is comprised of aluminum. In the embodiment of FIGS. 9 and 10, the shims 38A and 42A are not cast with plate 21A as will be described herein below.

In the embodiment of FIGS. 9 and 10, the shim 38A is secured to plate 21A of spacer 20A by screws 46 and 48 extending through screw openings 50 and 52 in plate 21A and threaded openings 54 and 56 in shim 38A. In the embodiment of FIGS. 9 and 10, the shim 42A is secured to plate 21A of spacer 20A by screws 56 and 58 extending through screw openings 60 and 62 in plate 21 of spacer 20A and into threaded openings 64 and 66 in shim 42A.

Figure 4:
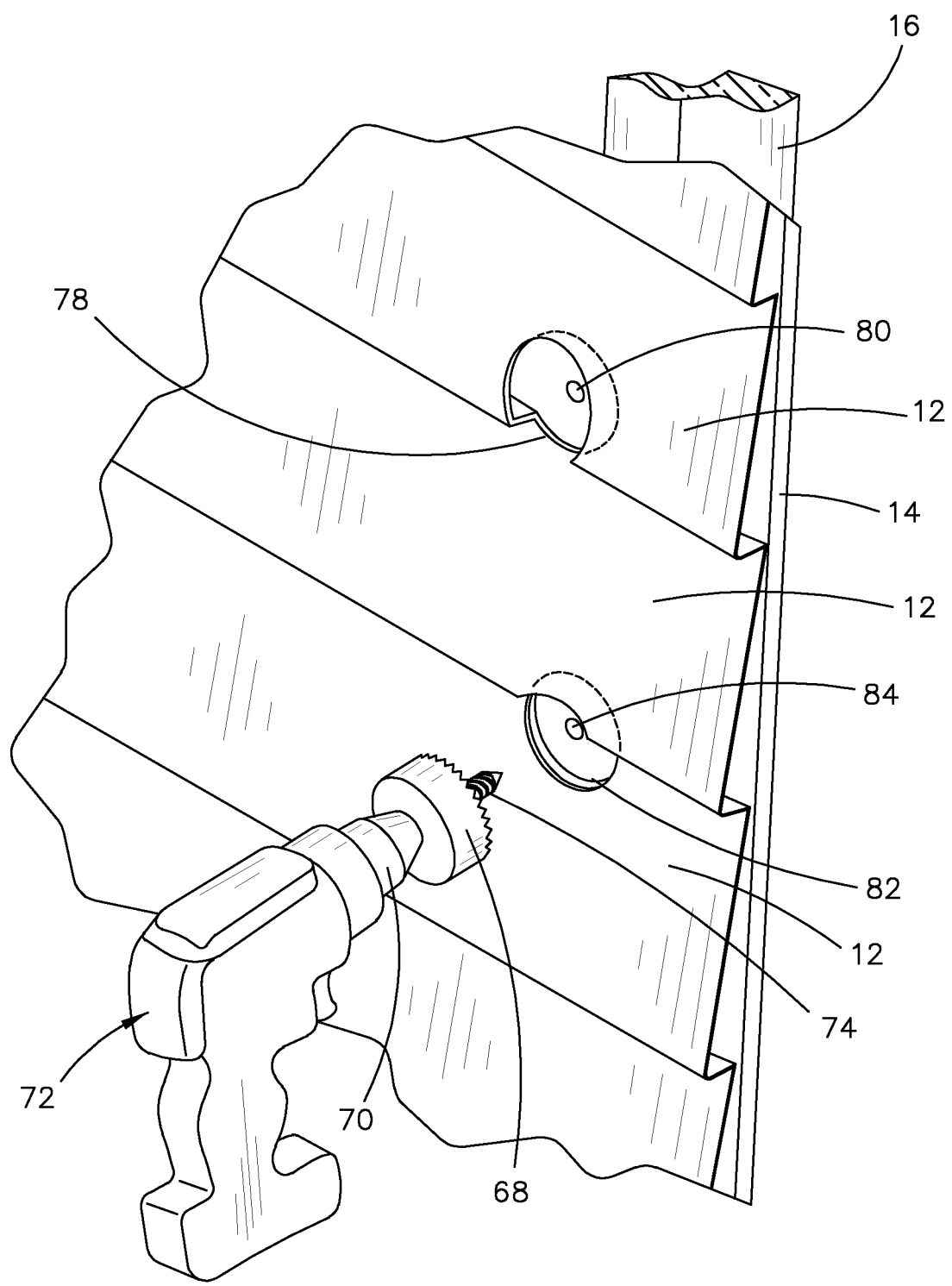
FIG. 4 is a partial outer perspective view illustrating how openings are initially created in the siding members of a building with a hole saw and a pilot drill bit.
Figure 5:
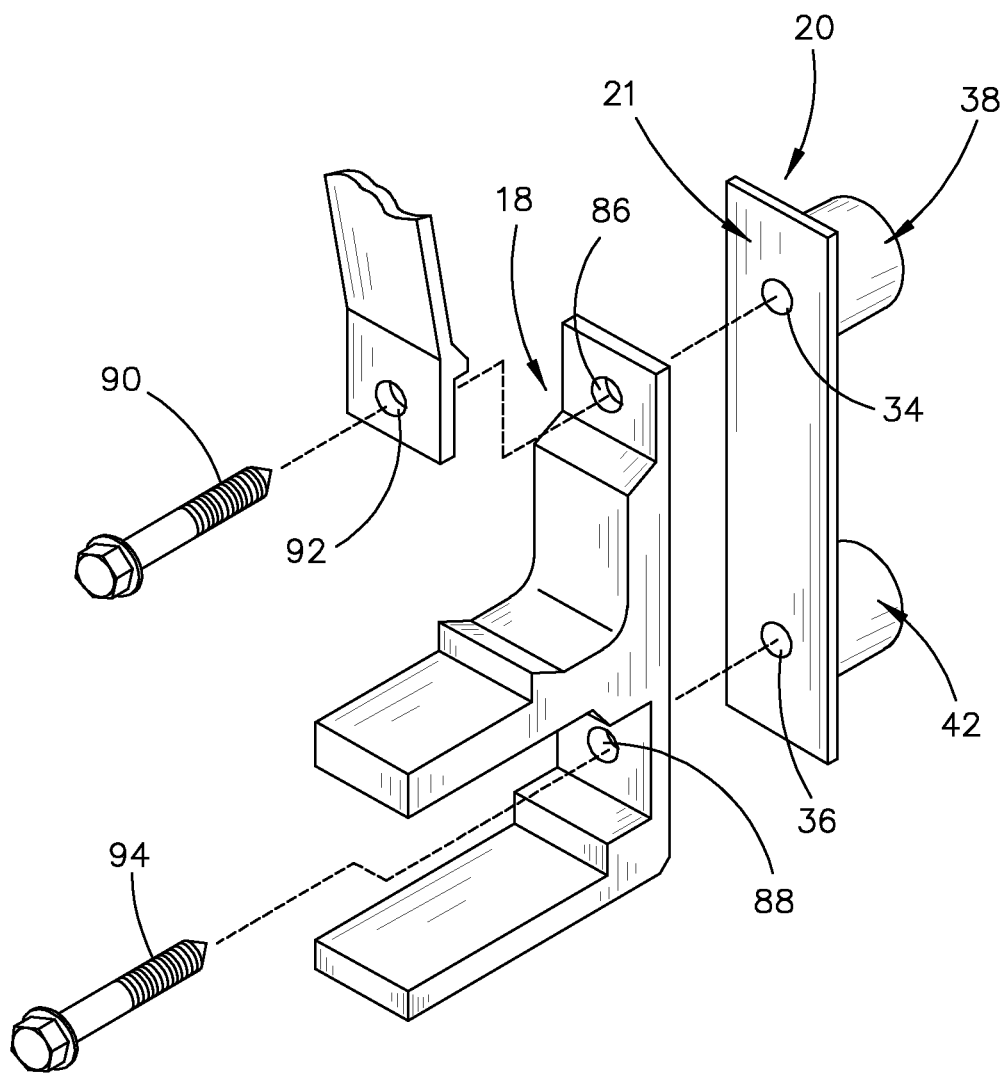
FIG. 5 is a partial exploded perspective view illustrating the relationship of the spacer of the invention and a typical awning bracket.
Figure 6:
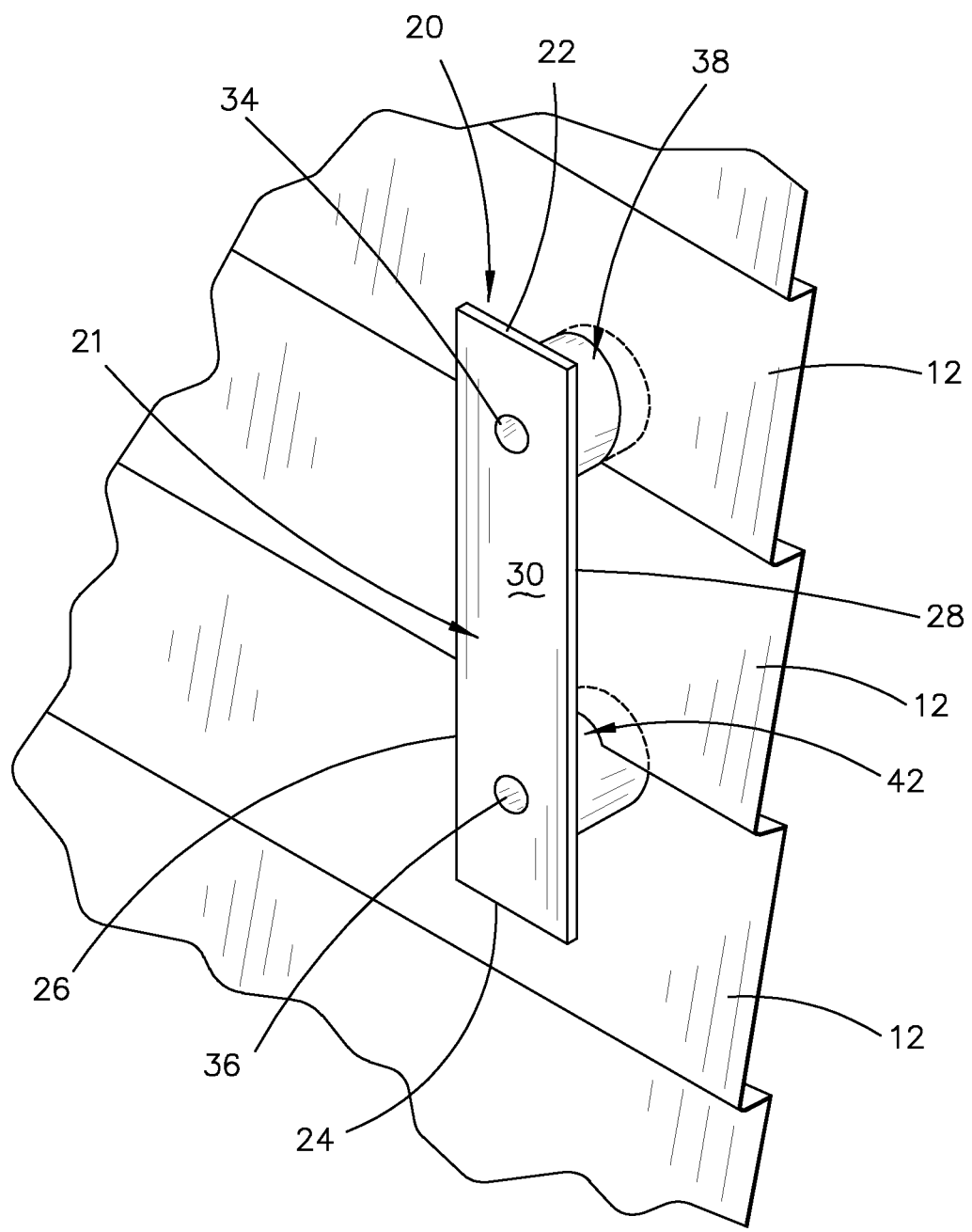
FIG. 6 is a partial outer perspective illustrating the spacer of this invention positioned at the outer side of the siding members of a building.
Figure 7:
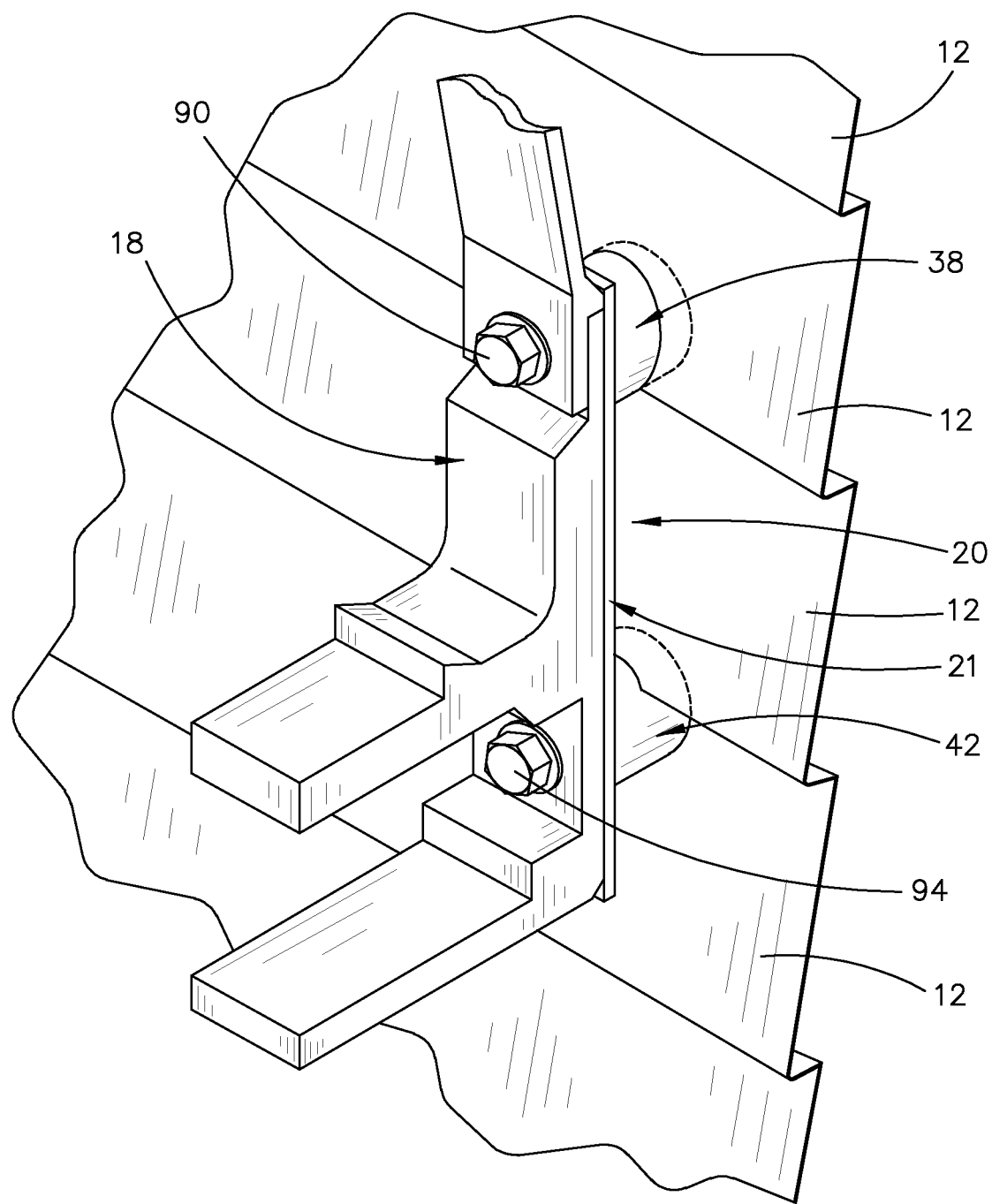
FIG. 7 is a view similar to FIG. 6 except that an awning bracket has been positioned at the outer side of the spacer bracket and the awning bracket and spacer having been mounted on the side of the building.
Figure 8:
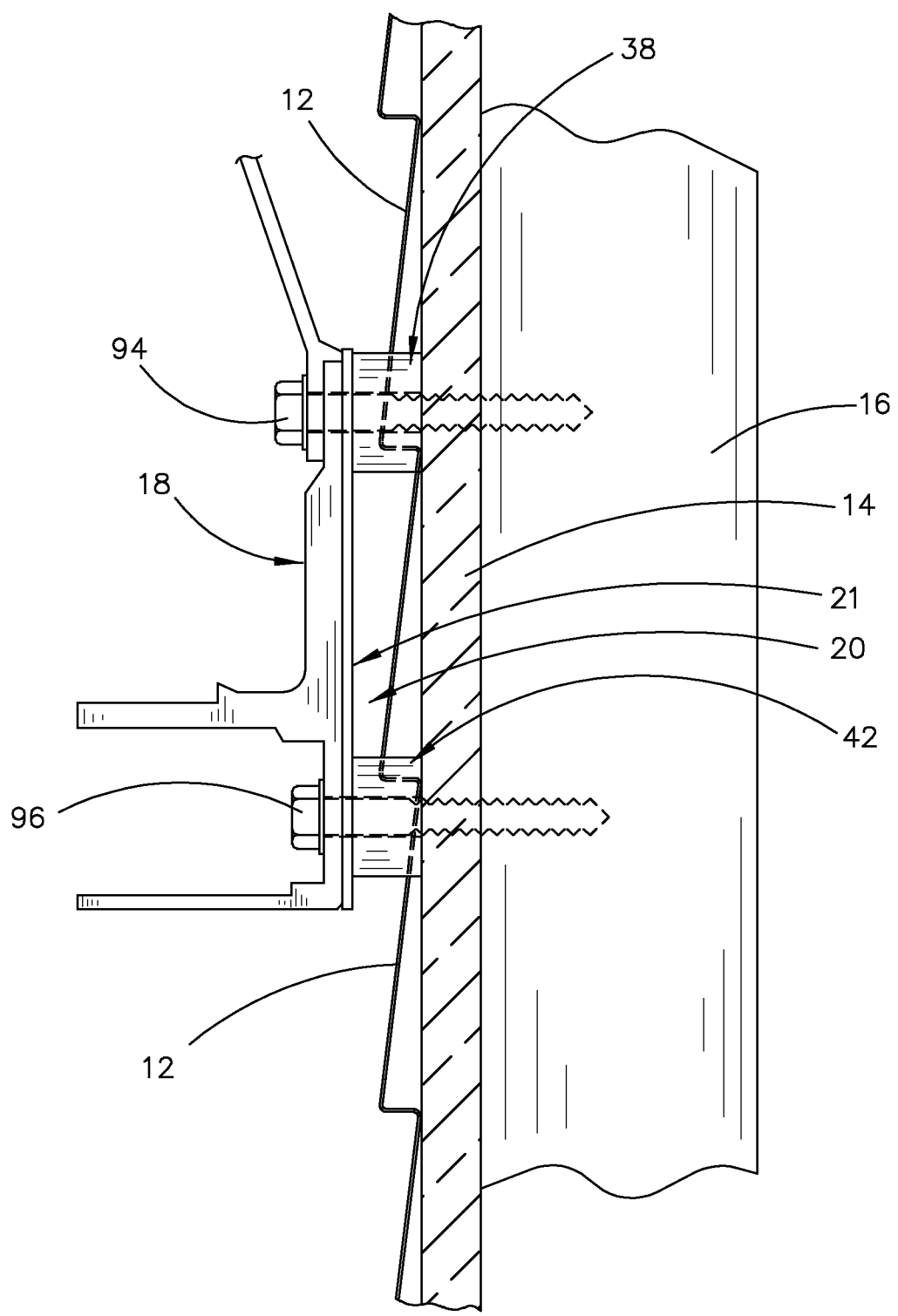
FIG. 8 is a partial sectional view illustrating the spacer and awning bracket secured to the building sheeting and studs.

The steps of installing the spacers 20 and 20A and using the same will now be described. As seen in FIG. 4, a hole saw 68 is mounted in the chuck 70 of a drill 72 with the hole saw 68 having a pilot drill bit 74 extending outwardly therefrom. The hole saw 68 cuts a large opening 78 in the siding 12 until the teeth of the hole saw reach the outer side of the sheathing 14. At that same time, the pilot drill bit 74 creates a pilot hole 80 in the sheathing 14 and the stud 16. The operator then creates openings 82 and 84 below the openings 75 and 80. The spacer 20 is then positioned adjacent the siding member 12 to that shim 38 registers with opening 78 and so that shim 42 registers with opening 82. The shims 38 and 42 are then pushed into the openings 78 and 82 respectively until the inner ends of the shims 38 and 42 engage the outer side of the vertical sheathing 14 which means that the plate 21 will be preferably vertically disposed.

The awning bracket 18, which may have many configurations, will always have an upper opening 86 and a lower opening 88 formed therein. The awning bracket 18 is positioned at the outer side of spacer 20 so the openings 86 and 88 of the awning bracket are aligned with openings 34 and 36 in plate 21 respectively. Lag screw 90 is then extended through opening 92 of awning bracket 18, through opening 86 in awning bracket 18, through opening 34 in plate 21, through shim 38, through bolt guide 40, and into the pilot opening 80 in sheathing 14 and stud 16. Lag screw 94 is then extended through opening 88 in awning bracket 18, through opening 36 in plate 21, through shim 42, through bolt guide 44, into pilot opening 84 in sheathing 14, and into stud 16.

Since the spacer 20 is vertical as explained above, the awning bracket 18 will be plum even though the siding members have an irregular exterior surface.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A spacer device for use in mounting an awning bracket for installing an awning to the slide of a building having horizontally disposed and overlapping siding members, comprising:

an elongated and upstanding rectangular plate having an upper end, a lower end, a first side edge, a second side edge, an inner side and an outer side;

a first screw opening formed in said rectangular plate below said upper end thereof;

a second screw opening formed in said rectangular plate above said lower end thereof;

an upper hollow cylindrical shim, having inner and outer ends, extending from said inner side of said rectangular plate so as to communicate with said first screw opening in said rectangular plate;

a lower hollow cylindrical shim extending from said inner side of said rectangular plate so as to communicate with said second screw opening in said rectangular plate;

an awning bracket having an upper screw opening formed therein and a lower screw opening formed therein;

said awning bracket being positioned at said outer side of said rectangular plate whereby said upper and lower screw openings in said awning bracket register with said upper and lower screw openings in said rectangular plate respectively;

an upper screw extending inwardly through said upper screw opening in said awning bracket, through said upper screw opening in said rectangular plate, and through said upper hollow cylindrical shim to connect with a base surface in which sliding members are connected to the base surface; and a lower screw extending inwardly through said lower screw opening in said awning bracket, through said lower screw opening in said rectangular plate, and through said lower hollow cylindrical shim to connect with a base surface in which sliding members are connected to the base surface.

2. The spacer device of claim 1 wherein said rectangular plate and said upper and lower hollow cylindrical shims are of one-piece construction.

3. The spacer device of claim 1 wherein a screw guide is positioned at said inner end of each of said upper and lower hollow cylindrical shims.

* * * * *